United States Patent [19]

Inada

[11] 4,086,700
[45] May 2, 1978

[54] CUTTING HEAD FOR A MOWER

[75] Inventor: Kiichi Inada, Tokyo, Japan

[73] Assignee: Elta Machine Industrial Co., Ltd., Tokyo, Japan

[21] Appl. No.: 704,931

[22] Filed: Jul. 13, 1976

[51] Int. Cl.² .................. B26B 27/00; A01D 55/18
[52] U.S. Cl. .................................. 30/276; 30/347; 56/295
[58] Field of Search ............ 30/276, 347; 56/295, 56/12.7, 256; 15/159 A, 198

[56] References Cited

U.S. PATENT DOCUMENTS

| 3,018,602 | 1/1962 | Diesterweg | 56/295 |
| 3,320,732 | 5/1967 | Kirk | 56/295 |
| 3,831,278 | 8/1974 | Voglesonger | 30/276 |
| 3,900,071 | 8/1975 | Crawford | 56/256 |

*Primary Examiner*—Jimmy C. Peters
*Attorney, Agent, or Firm*—Wenderoth, Lind & Ponack

[57] ABSTRACT

A cutter for a lawn mower has a rotating disc for mounting on a driving mechanism, the disc having a cavity therein and two openings at diametrically opposite points in the periphery of the disc and opening out of the disc from the cavity. A guide member is provided on the opposite side of the each opening and each pair of opposed guide members defines the opening therebetween. The disc has holes therein inclined outwardly from a surface of the disc other than the periphery and extending into the cavity, one hole being provided adjacent each of the openings. A plurality of flexible wire-shaped cutting members, each having a wire-shaped portion of a flexible material and a stop on one end thereof, extending through the inclined holes and through the cavity and out through the openings and project beyond the periphery of the disc, with the stops against the surface of the disc for preventing the cutting members from being flung outwardly of the disc during rotation thereof.

4 Claims, 7 Drawing Figures

CUTTING HEAD FOR A MOWER

BACKGROUND OF THE INVENTION

This invention relates to a cutter for a mower, and more particularly to a cutter for a mower which cuts grass by rotating flexible synthetic resin wire-like cutting members at high speed.

The prior art mowers generally cut grass by rotating metal cutting blades at high speed, and there is a possibility of injury to persons from the rotating blades when the mowers are mishandled while cutting grass in gardens, parks, highway separation areas and the like.

Furthermore, when trimming grass around trees, flower-beds, road shoulders and the like, there is the possibility that the cutting blade will strike such obstacles, which occasionally leads to loss of control of the mower, damaging the blades and throwing pieces thereof, and damaging the trees etc.

To overcome these disadvantages, a mower that cuts grass at high speed by means of rotating flexible synthetic resin cutting members or wires instead of metal cutting blades has been developed.

The mowers of this kind are two types: one has a rotating disc which has an adequate number of apertures in the periphery thereof and is attached to a tip of a rotating shaft, and flexible wire-shaped cutting members are fixed in the apertures of the rotating disc — that is, no replacement wire-shaped material is provided in the rotating disc; and the other contains a flexible wire-shaped cutting members wound in a spiral in the rotating disc attached to a tip of the rotating shaft with ends projecting from the disc — that is, replacement wire-shaped material is provided in the rotating disc.

Compared with a lawn mower using metal cutting blades, a lawn mower of this kind is safer and is capable of trimming grass around trees, flower-beds, road shoulders and the like with ease and without damaging such objects.

This type of mower is described in United States Pat. Nos. 3,708,967 and 3,859,776, etc.

The former type cutter having no built-in replacement wire-shaped cutting material has advantages from the standpoint of reliability and cost because of its simple construction.

In the U.S. Pat. No. 3,708,967, there is disclosed a rotating disc which has a plurality of apertures adjacent the periphery thereof, holes extend radially from the apertures to the periphery, cutting lines pass through the apertures to the outside of the disc, and knotted ends of lines in the apertures prevent the lines from being flung off the disc during its rotation.

However, since the line material is of sufficiently hard synthetic resin to withstand impact with grass and the like and has a large diameter, it is extremely difficult to knot the ends and it requires much skill and a relatively long time to pass the lines through the holes.

SUMMARY OF THE INVENTION

Accordingly, it is an object of the present invention to provide a cutter for a mower of the type shown in U.S. Pat. No. 3,708,967, wherein flexible wire-shaped cutting members can be easily attached to the rotating disc and can also be exchanged easily and speedily.

It is another object of the present invention to provide a cutter for a mower that reduces the bending stress of the wire-shaped cutting members during rotation of the rotating disc, thus extending the service life of the wire-shaped cutting members.

Other and further objects of the present invention will become apparent from the following description taken in connection with the accompanying drawings.

DETAILED DESCRIPTION OF THE INVENTION

A cutter for a mower according to the present invention comprises a rotating disc 11 and a plurality of flexible wire-shaped cutting members 12 extending from the periphery of the rotating disc. The rotating disc 11 is fixedly secured to one end of a rotating shaft 13. As in the similar type mower of the prior art, the opposite end of the rotating shaft is fixedly secured to a frame in a bearing, and is further connected to a driving means such as motor or small size internal combustion engine.

Figure 1:
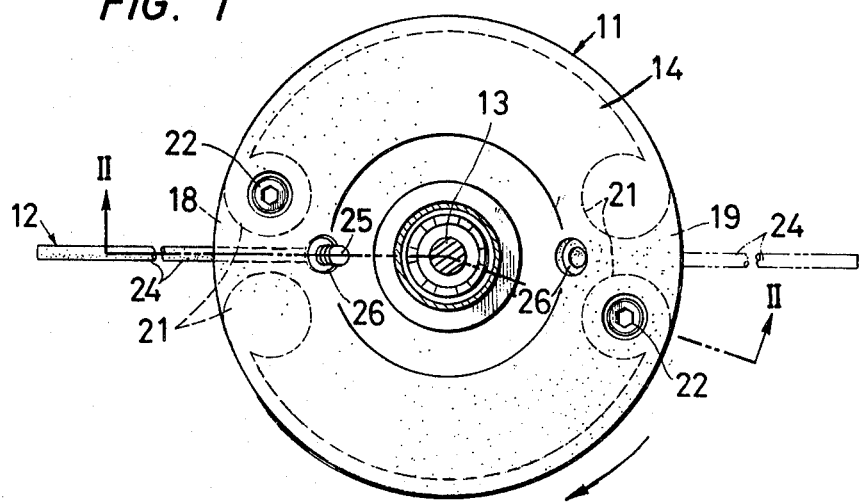
FIG. 1 is a plan view of the cutter of the present invention with the mower shaft on which the cutter is mounted being shown in section.
Figure 2:
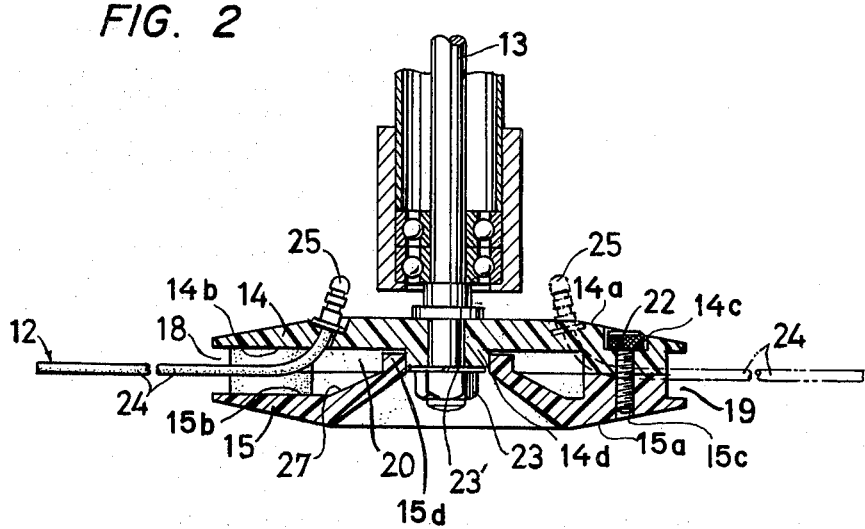
FIG. 2 is a sectional elevation taken on line II—II of FIG. 1.
Figure 3:
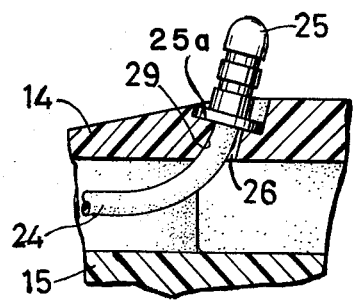
FIG. 3 is a greatly enlarged detailed vertical sectional view of a part of FIG. 2.
Figure 4:
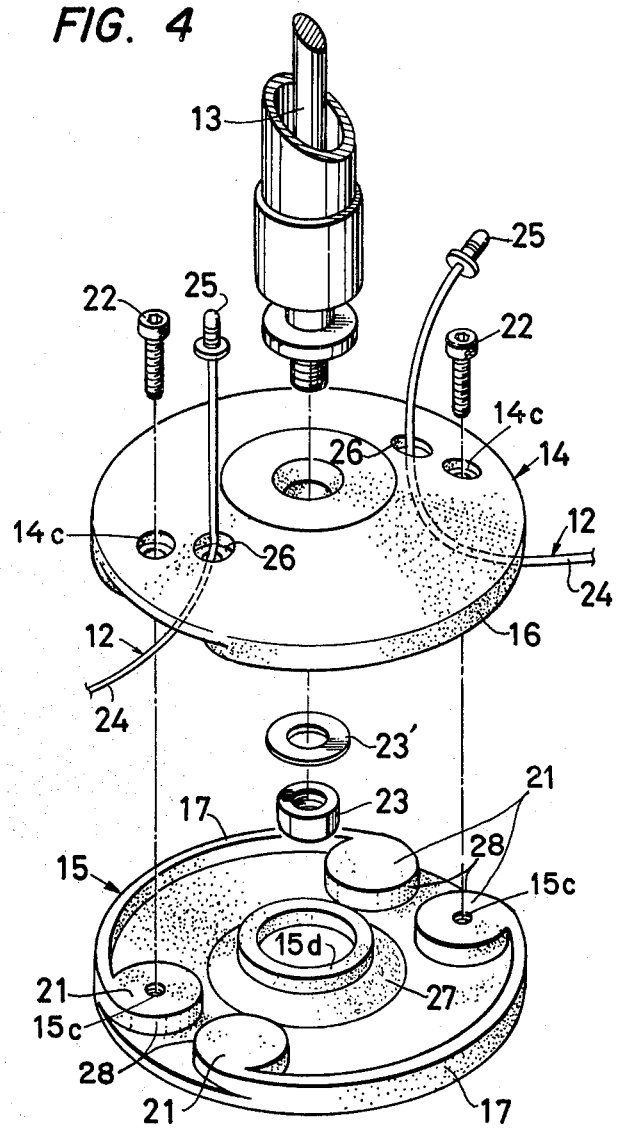
FIG. 4 is an exploded perspective view of the cutter.
Figure 5:
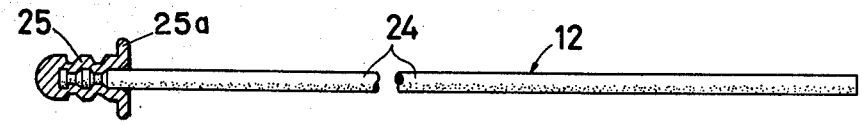
FIG. 5 is a partially sectional side view of one end of the flexible wire-shaped cutting member used with the cutter.

As shown in FIG. 1 to FIG. 3, the rotating disc 11 consists of two parts 14 and 15 preferably of synthetic resin. The upper rotating disc part 14 and lower rotating disc part 15 each have a curved outer surface 14a and 15a and a flat inner surface 14b and 15b opposed to the inner surface of the other disc part and on which circular walls 16 and 17 are integrally formed along the peripheral edges thereof.

The two circular walls are provided with openings that are diametrically opposite each other.

When the two disc parts 14 and 15 are put together with the circular walls 16 and 17 abutting the openings, the openings form apertures 18 and 19 and the space between the inner surfaces and within the walls 16 and 17 constitutes a cavity 20.

On opposite sides of the openings in the peripheral walls on both the upper and lower rotating disc parts are provided guide members in the form of bosses 21 which are integrally formed with the disc parts. When the upper and lower disc parts are put together, the bosses abut and the two disc parts are secured to each other by inserting a bolt 22 into an aperature 14c in the upper disc part and threading it into a threaded bore 15c in a boss 21 in the lower disc part. The lower disc part has an upwardly directed projection 15d having a bore into which a boss 14d on the upper disc part is inserted. The rotating shaft 13 is fixedly secured to the rotating disc by having the shaft 13 inserted into the bore of the boss 14d and further extended into the projection 15d and fixed to projection 14d with a nut 23 and a washer 23'.

Moreover, in the bore in the projection on the lower disc, the wall forming the recess where the nut 23 is placed is dished for ease of mounting the nut.

The cutting members 12 have wire-shaped portions 24 with a diameter and of material similar to the corresponding type of mower of the prior art.

A stop 25 is provided on one end of each cutting member and is a hollow cylinder with one closed end, and a flange 25a is provided around the other end of the cylinder. The stop 25 is made of material having high elasticity like aluminum and hardness higher than the wire-shaped portion 24.

The wire-shaped portion is clamped to the stop by deforming the stop into which one end of the wire-shaped portion has been inserted, without damaging the wire-shaped portion.

The cutting members 12 are attached to the rotating disc by passing the wire-shaped portions 24 through apertures 26 in the upper disc part.

The diameter of each aperture 26 is larger than that of the wire-shaped portions 24 and smaller than that of the flange 25a of the stop 25.

Each aperture 26 is positioned between two bosses 21, and adjacent to the apertures 18 and 19 at the periphery of the disc and is located at sufficient distance from the opening.

Moreover, each aperture 26 is inclined at an angle downwardly and outwardly of the disc as clearly shown in FIG. 3.

The aforesaid arrangement of the apertures 26 causes the wire-shaped portion 24 to pass through the aperture and the opening at the periphery of the disc in an extremely easy manner.

To facilitate the insertion of the cutting wire, the surface 27 on the inside of the lower disc part around the projection 15d crowned.

The cutting member is snugly fitted to the disc by pulling the wire-shaped portion 24 projecting from the opening 18 or 19 until the flange 25a abuts the disc part in the vicinity of the aperture 26 in order to avoid loosening during rotation, whereby a specific length of the wire-shaped portion extends from the periphery of the disc.

The bosses are in substantially cylindrical shape, and arranged so that peripheries 28 thereof form the apertures 18 and 19. Furthermore, the peripheries 28 of the bosses are curved into the outer surfaces of the ends of the circular walls 16 and 17 around the disc parts to form curved walls for said apertures.

The cutting members, in the same manner as the cutting members of the prior art devices, first come in contact with a surface on the trailing side, and then with a surface on the leading side. As a result, the wire-shaped portions are gradually bent, so that bending stress in the wire-shaped portions is reduced to a minimum.

According to the present invention, the aforesaid provision as well as the arrangement of the apertures 26 make it possible to minimize the bending angle of the whole wire-shaped portions as well as at the junction between the wire-shaped portion and the stop since the diameter of aperture 26 is greater than the diameter of the wire-shaped portion, thus greatly extending the service life of the cutting members.

In the cutter according to the present invention, as clearly shown in FIG. 3, wall 29 of the aperture 26 which is toward the aperture 18 is curved in accordance with condition and position of the wire-shaped portion when the cutter rotates at the required speed.

Accordingly, the aperture inclination and this curved wall let the wire fit closely to the curved wall of the aperture when the wire is subject to tension caused by rotation of the cutter.

In addition, this close fit and contact between the stop flange 25a and the vicinity of the disc around the aperture 26 prevents the wire-shaped cutting member from being flung outwardly from the rotating disc.

The above-described fit and contact reduce the connection force or clamping force between the wire-shaped portion and the stop to a minimum, preventing withdrawal of the wire-shaped portion from the stop due to damage caused by the deformed portion of the stop.

Therefore, it will be clearly understood that the wire-shaped portion is deformed by the deformed portion of the stop for clamping without damage to the wire-shaped portion.

The cutter of the present invention, in the same manner as the similar type of the prior art, cuts grass in a cutting plane defined by the cutting members during rotation of the cutter which is normal to or inclined to the grass.

To make this cutting operation easier, the lower surface of the lower disc part is provided with a curved wall with a flat portion at the center of the said curved wall or the vicinity around the rotating shaft or the center of rotation.

When the wire-shaped portion 24 of the cutting member 12 is broken or worn out from cutting grass, the rotating disc 11 is stopped, the cutting member is withdrawn from the aperture 26, and a new cutting member is inserted into the rotating disc as described above.

Figure 6:
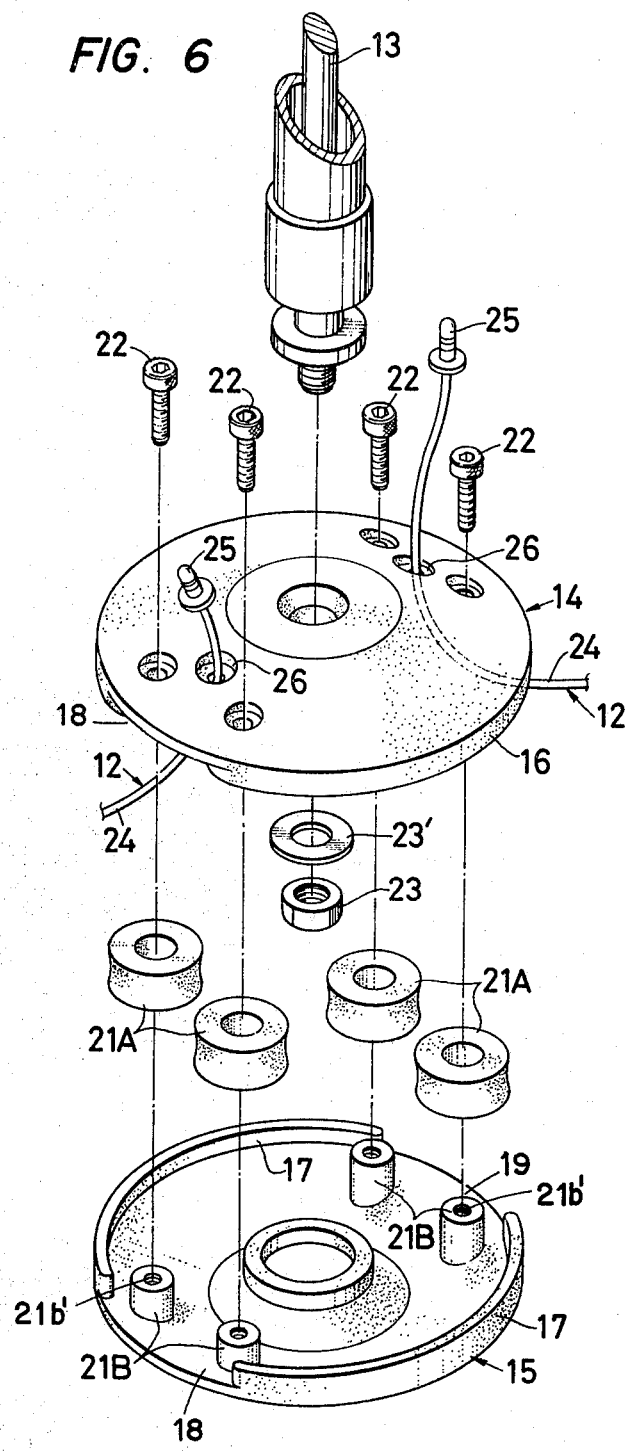
FIG. 6 is an exploded perspective view of a modified embodiment of the present invention.

FIG. 6 illustrates a modified cutter embodying the present invention.

The rotating disc 11, similar to the foregoing cutter, is composed of the upper rotating disc part 14 and the lower rotating disc part 15, both of which are shaped in a substantially dish-shaped configuration having walls 16 and 17 around the peripheral edges thereof so as to form a cavity between them when they are assembled.

The rotating shaft 13 is inserted into a center bore of the assembled disc and the disc is attached to one end of the rotating shaft 13 by nut 23 and washer 23' as in the embodiment of FIGS. 1 to 4.

Moreover, the upper rotating disc part 14 is provided with two apertures 26 which open into the cavity 20 for passing the cutting members 12 therethrough.

The upper rotating disc part 14 is countersunk around the apertures 26 so as to engage with flanges of the stops 25 of the cutting members 12.

At the peripheries of the upper and lower rotating disc parts are two openings 18 and 19, which are located adjacent the apertures 26 and the corresponding openings 18 and corresponding openings 19 define peripheral apertures in the rotating disc.

In this cutter, guide members in the form of a pair of rollers 21A are located on opposite sides of the peripheral aperatures defined by openings 18 and 19 to guide the cutting members 12 extending outwardly of the rotating disc through the apertures.

More specifically, shafts 21B on which rollers 21A are rotatably mounted project upwardly from the lower rotating disc part 15 in the vicinity of the openings 18 and 19 of the lower rotating disc part 15.

In addition, the projecting shafts 21B are provided with threaded holes 21B' for receiving bolts 22.

The rollers are rotatably mounted on the shafts, and then the tightening bolts 22 are threaded into the holes in the shafts of the lower disc 15 after passing through the upper disc part 14, whereby the upper disc part 14 is fixed to the lower disc part 15 with the rollers being rotatably positioned on shafts 21B.

In this arrangement of rollers, the roller and the wire-shaped portion of a cutting member contacting it move together when slight longitudinal elongation of the wire-shaped portion is caused by rotation of the rotating disc or by self-elongation of the wire during cutting grass, whereby friction between the wire-shaped portion and the curved portion of the roller can be substantially eliminated, thus preventing wear of the wire-shaped portion in contact with the roller and the resultant breakage of the wire-shaped portion.

Figure 7:
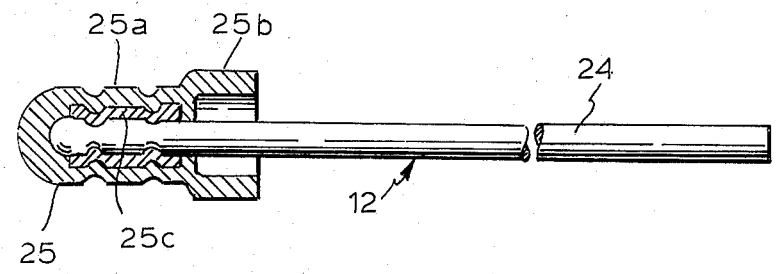
FIG. 7 is a view similar to FIG. 5 of a modified form of cutting member.

FIG. 7 shows a modified stop for the cutting member of the present invention.

The cutting member 12 is made of a fine wire-shaped portion 24 of flexible synthetic resin or the like of the desired specific length, one end of the cutting member 12 being provided with the stop 25 which is engaged with the countersunk recess around the aperture 26 of the rotating disc.

The stop 25 comprises a hollow cylindrical portion 25A and a flange portion 25B having diameter larger than that of apertures 8 and 9, both portions being made of soft plastic and integrally formed, and a collar 25C made of flexible metal harder than copper, aluminium wire or the like and cast inside the clamping portion 25A.

The end of the wire-shaped portion 24 is inserted into the stop, and then the clamping portion 25A of the stop is deformed with an appropriate tool such as pliers so that the collar 25C and wire-shaped portion are properly engaged and deformed as shown in FIG. 7.

I claim:

1. A cutter for a lawn mower comprising: a rotating disc for mounting on a driving mechanism, said disc having a cavity therein and two openings at diametrically opposite points in the periphery of the disc and opening out of the disc from the cavity, a guide member on the opposite side of each opening and each pair of opposed guide members defining the opening therebetween, and said disc having holes therein inclined outwardly from a surface of the disc other than the periphery and extending into the cavity, one hole being provided adjacent each of said openings; and a plurality of flexible wire-shaped cutting members, each having a wire-shaped portion of a flexible material and a stop on one end thereof, said stop being of an elastic material harder than the material of the wire-shaped portion and having a flange thereon larger than said inclined holes, said wire-shaped portions of said cutting members extending through said inclined holes and through said cavity and out through said openings and projecting beyond the periphery of said disc, with said flanges against the surface of the disc from which said holes extend for preventing the cutting members from being flung outwardly of the disc during rotation thereof.

2. A cutter as claimed in claim 1 in which the surfaces of said guide members which are opposed to each other to define an opening therebetween are substantially cylindrical with the curvature being in the direction in which the opening extends from the cavity to the periphery of the disc.

3. A cutter as claimed in claim 1 in which said guide members are rollers in said cavity the peripheries of which are spaced to define said openings therebetween.

4. A cutter as claimed in claim 1 in which said stop comprises a hollow cylindrical portion having a flange thereon and in which one end of said wire-shaped portion is inserted, and a collar of a permanently deformable material within said cylindrical portion and deformed into clamping engagement with said wire-shaped portion for retaining said wire-shaped portion in said stop.

* * * * *